March 10, 1970 M. EPSTEIN ET AL 3,500,461

KINETOMAGNETIC PIEZOELECTRIC AND PIEZORESISTIVE TAPPING TECHNIQUES FOR NONMAGNETIC DELAY LINES

Filed March 16, 1967

INVENTORS
MAX EPSTEIN
DAVID FRYBERGER
ROBERT J. SERAFIN
ANTHONY P. VAN DEN HEUVEL

BY D. James Bader ATTORNEY

United States Patent Office 3,500,461

Patented Mar. 10, 1970

3,500,461

KINETOMAGNETIC, PIEZOELECTRIC AND PIEZORESISTIVE TAPPING TECHNIQUES FOR NONMAGNETIC DELAY LINES

Max Epstein, Highland Park, David Fryberger, Chicago, Robert J. Serafin, Highland Park, and Anthony P. van den Heuvel, Homewood, Ill., assignors to ITT Research Institute, Chicago, Ill., a not-for-profit Illinois corporation Filed Mar. 16, 1967, Ser. No. 623,674
Int. Cl. H03b *7/30*
U.S. Cl. 333—30 19 Claims

ABSTRACT OF THE DISCLOSURE

A new and improved means and method for tapping non-magnetic delay lines at desired intervals. Three specific techniques are taught and are designated the kinetomagnetic, piezoelectric and piezoresistive techniques. Each technique involves a means for detecting mechanical surface waves on a solid without distorting the wave or removing significant energy therefrom. The kinetomagnetic technique consists of depositing film conductors on the surface of a solid perpendicular to the direction of propagation of the surface wave and inserting the delay line in a magnetic field. The movement of each conductor in the magnetic field as a wave passes induces an E.M.F. in the conductor which is detected by known means. The piezoelectric technique consists of depositing a film of piezoelectric material and two conductors on the delay line and detecting the voltage generated when a wave strains the film. The piezoresistive technique consists of applying a piezoresistive film and two conductors to the surface of the delay line and applying a constant voltage across the film and sensing current variations as a wave strains the film.

SUMMARY OF THE INVENTION

Our invention comprises three novel techniques for tapping acoustical delay lines without disturbing the signal significantly. Further, our invention permits the use of such common materials as glass in the manufacture of delay lines and eliminates the need for expensive single crystal lines. The propagation medium must have good acoustical transmission properties. Each tapping techniques is characterized by a deposition of electrodes along one surface of a body of suitable material; by the creation of a Rayleigh surface wave in the body of material at the surface where the electrodes are attached; and by a detected change in the electrical characteristics at the electrodes as the wave passes.

The primary object of our invention is to provide an inexpensive acoustical delay line and tapping means therefor.

An additional object is to provide reliable tapping means for an acoustical delay line which remove a minimum of energy from the line.

DESCRIPTION OF THE PREFERRED EMBODIMENTS

Acoustic delay lines of many types and configurations are known in the art. A delay line is a means for slowing down an electrical signal. The objective is usually to convert an electrical signal to an acoustic wave of much slower velocity, and to reconvert the acoustic signal to an electrical signal without distortion. The only result is a displacement relative to time. In older devices the acoustic energy traversed the delay line as internal waves. As such, these waves were difficult to tap at any interval short of the end of the delay line. Later devices solved the tap problem by using a multisided prism and reflecting the wave off of several faces. This procedure had the advantage of being susceptible to tapping at each reflecting face. It was not entirely satisfactory, however, because of the cost of machining the various surfaces and the difficulty in designing the prism so that taps could be located where desired.

A more recent development is the use of Rayleigh surface waves to cut down on the dispersion losses and to render the wave more susceptible to tapping. The Rayleigh surface wave is a well known phenomenon named for a British scientist who discovered that a surface wave travels along the skin of a material at a speed determined by the material and that the wave penetrates the material only on the order of one wavelength. The result is an easily accessible pulse which has low energy losses and low dispersion.

Figure 1:
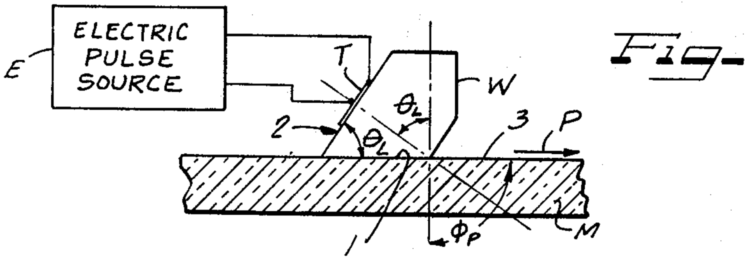
FIG. 1 (PRIOR ART)
FIGURE 1 is a partial cross sectional view of a portion of a delay line and a typical Rayleigh wave generation device.

The Rayleigh wave can be generated on the propagation medium by means of a wedge shaped block on which a compressional wave transducer is mounted. FIGURE 1 shows a typical wave generation set up including an electric pulse source E and a compressional wave transducer T. In this figure, the wedge W may be made of a variety of materials, though we prefer to use Lucite. The wedge is mounted on the propagation medium usually with silicone grease at 1 along the surface. The transducer T creates a wave in the Lucite W which propagates perpendicular to surface 2 thereof until it reaches the interface between the Lucite wedge W and the propagation medium M. The angle of incidence $\theta_L$ is selected for the particular materials so that the angle of refraction $\Phi_P$ of the propagation medium is 90°. The resultant Rayleigh wave propagates along propagation surface 3 of medium M in the direction of arrow P with only slight energy losses and little attenuation. For a Lucite wedge W on a Pyrex propagation medium M the optimum value for $\theta_L$ is approximately 60°. All of the above is known in the art and merely illustrates a preferred embodiment for our basic delay line. Several other materials are compatible and can readily be employed. Any of the known means for wave generation may also be employed.

Figure 2:
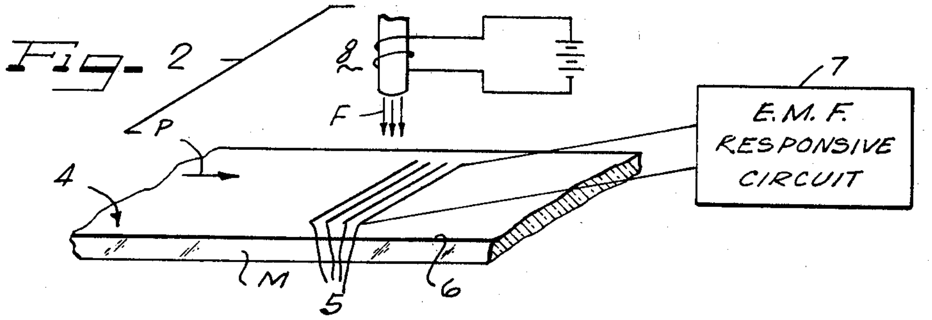
FIGURE 2 is a diagrammatic perspective view of a portion of a delay line having kinetomagnetic taps.

Our invention comprises a novel means for tapping a delay line as above described wherein the propagation medium M may consist of such common materials as glasses, some metals and fused (nonpiezoelectric) quartz. The criteria for selecting a material are that it have reasonably low absorption characteristics so that attenuation is minimized and that its fabrication is not prohibitively expensive. Four preferred embodiments encompassing three techniques are shown. The first of these which is shown in FIGURE 2 has been designated as a kinetomagnetic tap. In this figure a delay line 4 is formed of a nonpiezoelectric solid state propagation medium M having a series of conductors 5 deposited on the propagation surface 6 thereof in parallel arrangement. Each conductor is electrically connected to an E.M.F. (electromotive force) responsive circuit 7. The entire tap area is subjected to a steady, substantially uniform magnetic field, the lines of flux F of which are perpendicular to the surface 6. The magnetic field is generated by known means such as shown diagrammatically at 8. The conductors 5 are disposed at each desired tapping point and lie on surface 6 perpendicular to the direction of propagation of the Rayleigh wave. In operation waves are induced in surface 6 by some known method as described above, preferably as shown in FIGURE 1. The generating means is not shown in FIGURE 2. The waves propagate along surface 6 from left to right and as each phase front is intercepted by a conductor 5 the conductor moves along with the surface 6 in the direction of propagation. The movement of each conductor in the magnetic field induces an electromotive force in that conductor which may be detected by the associated circuit 7, for example. At each tap, the wave is thus converted back into an electrical signal preferably of the original form. The wave propagation characteristics are not materially affected by the deposited conductor if the deposition thickness is kept small with respect to a wavelength.

Figure 3:
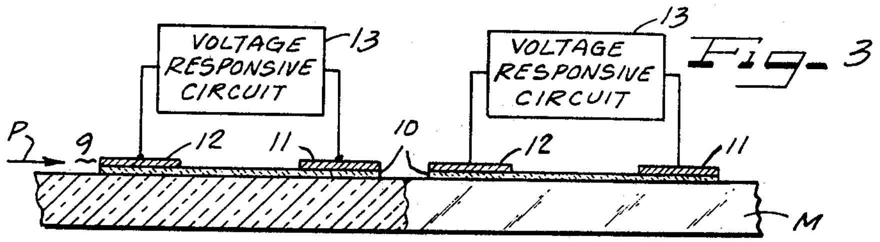
FIGURE 3 is a sectional view of a portion of a delay line having piezoelectric taps with the section being taken parallel to the direction of propagation of the wave.

FIGURE 3 represents a second preferred means for tapping delay lines. It has been designated the piezoelectric tap. In the illustrated embodiment, a delay line 9 is formed of a propagation medium M, shown in partial longitudinal cross section, and having a series of strips of piezoelectric film material 10 deposited on the propagation surface. The thickness of the piezoelectric films is less than 0.1 of the wave length of the acoustic wave travelling along medium M. Over each strip of such film, two film conductors 11 and 12 are deposited at opposite edges with a gap therebetween. As a Rayleigh wave passes each tap, the distortion of the piezoelectric film caused by strain in the direction of propagation creates a component of electric field in the same direction, that is in the direction of propagation. Each conductor is an equipotential surface. The difference in potential between electrodes 11 and 12 may be measured by making an electrical connection from each electrode to a voltage responsive circuit 13, for example. The piezoelectric tap has the advantage of generating its own voltage without the aid of a magnetic field or other outside energy source. Each tap consists of a piezoelectric film 10 and two film conductors 11 and 12 applied to the propagation surface perpendicular to the direction of wave propagation.

Figures 4, 6:
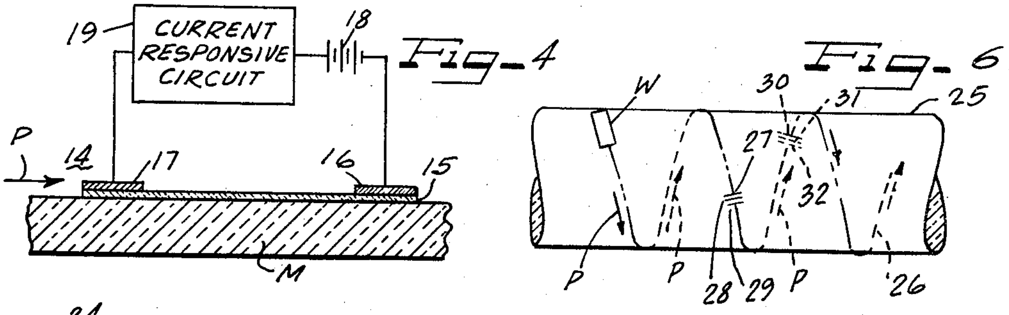
FIGURE 4 is a sectional view of a portion of a delay line having piezoresistive taps with the section being taken parallel to the direction of propagation of the wave.
FIGURE 6 is a diagrammatic perspective view showing a helical acoustic wave path.

The third embodiment of our tapping means has been designated the piezoresistive tap. FIGURE 4 shows a typical piezoresistive tap on a delay line. The delay line 14 comprises a propagation medium M having a deposited film of piezoresistive material 15 on the propagation surface. Electrodes 16 and 17 are deposited on opposite edges of film 15 leaving a gap. In operation, a constant voltage is applied across electrodes 16 and 17 by bias means 18. As a wave passes the strain causes the resistivity of the piezoresistive material 15 to vary and the variation may be sensed as a change in current through electrodes 16 and 17 by means of current responsive circuit 19. Thus, the operation of the piezoresistive tap is similar to the piezoelectric tap with the exception of the need for a bias voltage.

Figure 5:
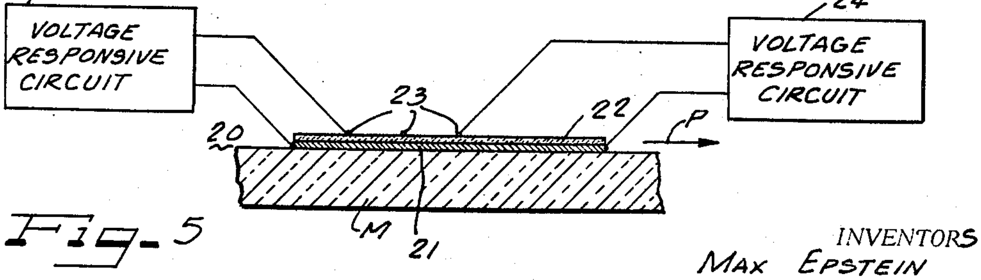
FIGURE 5 is a sectional view of a portion of a delay line having a modified piezoelectric tap with the section being taken parallel to the direction of propagation of the wave.

The fourth embodiment of our novel tapping means is shown in FIGURE 5. The principle involved is again the piezoelectric effect as in FIGURE 3. FIGURE 5 is a longitudinal section of a delay line 20 formed of a medium M having a conducting film 21 deposited on the propagation surface. A film of piezoelectric material 22 is deposited over and in contact with the film 21. One or more thin film electrodes 23 are deposited on the piezoelectric film in parallel configuration. The electrical connections are made across common electrode 21 and one or more of electrodes 23. The voltage generated by the shear component of a wave straining the piezoelectric film 22, which shear component moves electrodes 23 vertically, is then detected or utilized by known means indicated diagrammatically as a voltage responsive circuit 24. The piezoelectric film is as in FIGURE 3 very thin, less than 0.1 of the wavelength of the acoustic wave propagated along medium M.

In either the embodiment of FIGURE 3 or FIGURE 5, the piezoelectric film 10 or 22 may be continuous or interrupted between individual taps. The same is true in FIGURE 5 for the electrode 21. In any case, the piezoelectric film is not the propagating medium but is substantially less than a wavelength in thickness and is deposited over the propagating surface either directly or with the electrode 21 intervening.

In the embodiments of FIGURES 3 and 5, the strips of conductive material such as 11, 12 or 23 may be deposited directly on the propagation surface with the piezoelectric layer overlying the conductive strips except at the external connections to the conductive strips. In the embodiment of FIGURE 5, the common conductive layer such as 21 would then overlie the piezoelectric layer 22. Similarly the conductive strips 16, 17 in FIGURE 4 may underlie the piezoresistive film 15. In any of these arrangements, however, the various layers of conductive and wave-responsive material are all considered to be "on" the propagation surface and are mechanically supported thereby.

The exact operation of the thin film of piezoelectric material is not clearly understood. No attempt to explain the phenomena described with reference to FIGURES 3 and 5 is made herein. It is sufficient to say that a deposited film demonstrates piezoelectric properties in both the compressional direction as in FIGURE 3, and in the shear direction as in FIGURE 5.

Our devices eliminate problems of reflecting signals which would distort subsequent signals. Damping of surface waves is easily accomplished in all three techniques by applying a liquid or grease film to the propagation surface beyond the last tap thereby attenuating the wave without reflection. The deposition of the piezoelectric or piezoresistive films and of the electrodes in FIGURES 2–5 may be by any known method, such as vacuum deposition or cathode sputtering, and the technique of deposition per se forms no part of the invention.

One critical aspect of our invention lies in the thickness of the tap films. Attenuation and distortion of the wave are directly related to the mass of the material applied to the propagation surface. Our electrode films were of the order of 0.1 to one micron in thickness. As thickness increases, distortion becomes more pronounced. Electrode materials pose no problems. Silver, gold, copper and aluminum were among the metals tested as electrodes and all yielded equally good results. The dimension of each of the electrode films 5 and 23 in the direction of wave propagation P is preferably less than ½ the wavelength of the acoustic wave. Among the piezoelectric film materials employed were cadmium sulfide, cadmium selenide and cadmium telluride. Piezoelectric film thicknesses ranged from 0.25 micron to 3.0 microns. The thickness of the piezoelectric film is typically less than 0.1 wavelength. Each piezoelectric or piezoresistive strip had a longest dimension of one inch and was 2 millimeters in the direction of propagation. The electrodes 11 and 12 in FIGURE 3, and 16 and 17 in FIGURE 4 covered ½ millimeter on each edge with a 0.025 millimeter gap therebetween. The piezoresistive film 15 in FIGURE 4 may be of many known materials, and in the preferred embodiment, discontinuous gold films were employed. Examples of input signal frequencies are 10 megacycles per second or 100 megacycles per second.

As mentioned previously, the input signal is preferably recreated at each of the deposited taps. In many electrical signal processing applications the outputs from successive taps are added or subtracted coherently in a fashion that modifies the envelope and phase structure of the output signal in comparison to the input signal, but improves the signal to noise ratio. These processing applications are well known and per se form no part of our invention.

Any of the tapping means described herein may be applied to delay lines of different geometric form. One variation employed for compactness involves a circular rod of propagating medium wherein the wave propagates in a helical path along the outer surface. Taps are then applied along the propagation path to detect the passing waves. This variation is diagrammatically indicated in FIGURE 6 wherein the rod of circular cross section is designated by reference numeral 25 and the helical path of the acoustic wave is indicated by the helical dot dash line 26. Tapping means are indicated at 27–32 along the path 26.

In certain applications at extremely high frequencies the thickness of the piezoelectric layers in FIGURES 3 and 5, and in FIGURE 6 (when the piezoelectric type of tap is used) may equal or exceed somewhat 0.1 wavelength of the acoustic wave, i.e. the thickness may be of the order of 0.1 wavelength.

While our invention has been described in its preferred embodiments we do not intend that it be limited thereby. Certain modifications in materials and configurations will be obvious to one skilled in the art.

We claim as our invention:

1. An acoustic delay line comprising:

a body of acoustic wave propagating material having substantial acoustical transmission properties, said body having a propagation surface;

means mounted on said propagation surface for generating acoustical Rayleigh surface waves which travel along said propagation surface;

tapping means disposed on said propagation surface to intercept said acoustical surface waves, said tapping means comprising at least one electrode which moves as each of said surface waves passes; and detecting means coupled to said tapping means for supplying an output signal in response to the movement of said tapping means;

said body being formed of a solid state nonpiezoelectric material and said tapping means comprising only films on said propagation surface.

2. The delay line defined in claim 1 wherein said tapping means further comprises a deposited film of piezoelectric material on said propagation surface.

3. The delay line defined in claim 2 wherein said generating means transmits an acoustic wave of a predetermined wavelength, and said deposited film of piezoelectric material has a thickness dimension normal to said propagation surface of less than 0.1 of said predetermined wavelength.

4. The delay line defined in claim 2 wherein said generating means transmits an acoustic wave of a predetermined wavelength, and said deposited film of piezoelectric material has a thickness dimension normal to said propagation surface of the order of 0.1 of said predetermined wavelength.

5. The delay line defined in claim 1 wherein said electrode comprises a film of conductive material directly on said propagation surface, and said tapping means further comprises a deposited film of piezoelectric material overlying said film of conductive material.

6. The delay line defined in claim 1 wherein said electrode is deposited directly on said propagation surface and wherein said detecting means comprises a voltage responsive electrical circuit connected to said electrode;

said detecting means further comprising means for generating a magnetic field in the region of said tapping means.

7. The delay line defined in claim 1 wherein said tapping means comprises a deposited piezoresistive film on said propagation surface and two spaced film electrodes disposed in contacting relation to said piezoresistive film; and wherein said detecting means comprises an electrical circuit connected across said two electrodes;

said circuit including current responsive means and a bias source connected between said two electrodes for producing a current flow through said piezoresistive film therebetween and through said current responsive means.

8. A delay line defined in claim 1 wherein said propagation surface is of cylindrical configuration, and said generating means transmits said acoustical surface waves in a helical path along said propagation surface.

9. The delay line defined in claim 1 wherein said tapping means further comprises a deposited film of piezoelectric material on said propagation surface;

at least two film electrodes disposed in contacting relation to said piezoelectric material and in parallel disposition;

and wherein said detecting means comprises a voltage responsive circuit connected to said electrodes.

10. The delay line defined in claim 1 wherein a plurality of said tapping means are disposed along said propagation surface in the path of wave propagation.

11. Tapping means for an acoustical delay line having a propagation surface comprising:

a deposited film of piezoelectric material on the propagation surface;

two film electrodes disposed in spaced relation and contacting said piezoelectric film;

and voltage responsive means connected between said electrodes.

12. The tapping means defined in claim 11 wherein said piezoelectric film is of the order of 0.1 wavelength or less in thickness.

13. The tapping means defined in claim 11 wherein a film electrode of electrically conductive material is disposed directly on said propagation surface and underlies said film of piezoelectric material;

and at least one further film electrode overlies and is in contact with said piezoelectric film.

14. Tapping means for an acoustic delay line comprising at least one film electrode disposed over the propagation surface of a delay line;

detection means in operative relation with said electrode for detecting the movement of said electrode and converting the movement into an electrical signal; said detection means comprising means for generating a magnetic field in the tapping region and electrical connections to said electrode for sensing the electromotive force induced therein in response to movement thereof in said magnetic field.

15. In an acoustic delay line comprising:

a body of acoustic wave propagating material having substantial acoustical transmission properties, said body having a propagation surface along which acoustical surface waves are transmitted;

tapping means coupled to said body for sensing said acoustical surface waves and comprising a pair of electrodes;

wherein the improvement comprises said body being formed of a solid state material, and said tapping means further comprising a film of piezoelectric material supported by said body, and said electrodes being connected to said film of piezoelectric material for providing an output signal in response to traverse of said film by said acoustical surface waves.

16. The delay line defined in claim 15 with said film of piezoelectric material being a deposited film having a thickness dimension in the direction normal to said surface of less than one-tenth of the wavelength of the acoustical surface waves.

17. The delay line defined in claim 15 with said electrodes comprising films of electrically conductive material each having a thickness dimension of less than one-tenth of the wavelenth of the acoustical surface waves and being supported by said body.

18. The delay line defined in claim 15 with said body being formed of a solid state nonpiezoelectric material, said film of piezoelectric material being a deposited film having a thickness dimension in the direction normal to said surface of less than one-tenth of the wavelength of the acoustical surface waves.

19. The delay line defined in claim 18 with said electrodes comprising films of electrically conductive material supported on said propagation surface of said body and having a thickness dimension of less than one-tenth of the wavelength of the acoustical surface waves.

References Cited

UNITED STATES PATENTS 3,212,072 10/1965 Fuller .............. 333—30 X

HERMAN KARL SAALBACH, Primary Examiner

T. VEZEAU, Assistant Examiner

UNITED STATES PATENT OFFICE
CERTIFICATE OF CORRECTION

Patent No. 3,500,461 Dated March 10, 1970

Inventor(s) Max Epstein et al.

It is certified that error appears in the above-identified patent and that said Letters Patent are hereby corrected as shown below:

In the heading to the printed specification, line 7, "ITT Research Institute" should read -- IIT Research Institute --.

Signed and sealed this 23rd day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
★ U.S. GOVERNMENT PRINTING OFFICE : 1969 O—366-334